(12) United States Patent
Smith et al.

(10) Patent No.: US 9,316,260 B2
(45) Date of Patent: Apr. 19, 2016

(54) TILLING IMPLEMENT AND BEARING ASSEMBLY FOR USE THEREWITH

(71) Applicant: Unverferth Manufacturing Company, Inc., Kalida, OH (US)

(72) Inventors: David R. Smith, Fort Jennings, OH (US); Thomas Steffan, Cloverdale, OH (US); Shawn Gerdeman, Delphos, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 247 days.

(21) Appl. No.: 13/832,953

(22) Filed: Mar. 15, 2013

(65) Prior Publication Data

US 2014/0262383 A1 Sep. 18, 2014

(51) Int. Cl.
| | |
|---|---|
| *F16C 33/78* | (2006.01) |
| *A01B 33/08* | (2006.01) |
| *F16C 23/08* | (2006.01) |
| *F16C 19/06* | (2006.01) |

(52) U.S. Cl.
CPC .......... *F16C 33/7869* (2013.01); *A01B 33/087* (2013.01); *F16C 23/084* (2013.01); *F16C 33/7886* (2013.01); *F16C 19/06* (2013.01)

(58) Field of Classification Search
CPC .. F16C 33/76; F16C 33/7803; F16C 33/7823; F16C 33/7826; F16C 33/7869; F16C 33/7886; F16C 23/084; F16C 19/06; A01B 5/04; A01B 23/06
See application file for complete search history.

(56) References Cited

U.S. PATENT DOCUMENTS

| | | | | | |
|---|---|---|---|---|---|
| 2,097,244 | A | * | 10/1937 | Sjogren et al. | 172/599 |
| 3,140,129 | A | * | 7/1964 | Koss | 384/477 |
| 3,224,821 | A | * | 12/1965 | Barr | 384/484 |
| 3,311,429 | A | * | 3/1967 | Kocian | 384/475 |
| 3,314,735 | A | * | 4/1967 | Kocian | 384/475 |
| 3,330,607 | A | * | 7/1967 | Delp | 384/477 |
| 3,584,924 | A | * | 6/1971 | O'Neill | 384/482 |
| 4,249,782 | A | * | 2/1981 | Frank | 384/473 |
| 4,296,977 | A | * | 10/1981 | Ladin | 384/157 |
| 4,726,696 | A | * | 2/1988 | Dickinson et al. | 384/477 |
| 5,178,472 | A | * | 1/1993 | Lawson | 384/537 |
| 5,419,642 | A | * | 5/1995 | McLarty | 384/486 |
| 5,482,383 | A | * | 1/1996 | Gantt et al. | 384/513 |
| 5,678,930 | A | * | 10/1997 | Kreftmeyer et al. | 384/157 |
| 5,860,748 | A | * | 1/1999 | Okumura et al. | 384/486 |

(Continued)

OTHER PUBLICATIONS

"Agricultural Bearings," PEER Bearing Company Agricultural Bearings Catalog 1100-5, 28 pages plus 2 cover pages (accessed Apr. 1, 2013).

*Primary Examiner* — Robert Pezzuto
*Assistant Examiner* — Jessica H Lutz
(74) *Attorney, Agent, or Firm* — Rothwell, Figg, Ernst & Manbeck, P.C.

(57) ABSTRACT

A tilling implement for use with a farm vehicle includes a frame, a tilling element attached to the frame, a bearing assembly configured to allow the tilling element to rotate relative to the frame. The bearing assembly can include a first race, a second race spaced apart from the first race to define a gap therebetween, a bearing rotatably disposed within the gap to allow relative movement between the first race and the second race, a seal including a flexible protrusion having a distal end that presses against the first race to seal off the gap, and a stop positioned adjacent to the flexible protrusion configured to prevent the distal end of the protrusion from bending towards the bearing.

8 Claims, 8 Drawing Sheets

(56) References Cited

U.S. PATENT DOCUMENTS 6,003,876 A * 12/1999 Yamagishi et al. ........... 277/407
RE36,804 E * 8/2000 Kajihara et al. .............. 384/480
6,241,396 B1 * 6/2001 Shimomura et al. .......... 384/477
8,702,313 B2 * 4/2014 Liang et al. .................. 384/484

* cited by examiner

TILLING IMPLEMENT AND BEARING ASSEMBLY FOR USE THEREWITH

BACKGROUND

1. Field

The present application relates generally to an improved tilling implement for use with a farm vehicle as well as an improved bearing assembly suitable for use with such a tilling implement.

2. Background Art

A large variety of machines and techniques exist to prepare soil for agricultural or other use. For example, soil can be agitated to prepare it for planting or seeding by being turned over by a plow, cut by disks, pulverized by a harrow, as well as through the use of other techniques and machines. Several existing tilling machines include the use of rotating tools, such as rolling harrows, crumbler rollers, and other similar devices. Because such rotating tools are often dragged along soil and over foreign matter such as loose weeds, roots, and other residue, it is not uncommon for bearing assemblies used for tilling implements to fail due to contamination. There is a continuous need for improved tilling implements and related bearing assemblies that can better withstand such conditions.

SUMMARY OF INVENTION

In some embodiments of the present invention, a tilling implement for use with a farm vehicle includes a frame, a tilling element attached to the frame, and a bearing assembly configured to allow the tilling element to rotate relative to the frame. The bearing assembly can include a bearing, a seal spaced from the bearing and having a flexible distal end that presses against a portion of the bearing assembly to seal off a first portion of the bearing assembly containing the bearing, and a stop positioned adjacent to the seal to prevent the distal end of the seal from bending towards the bearing.

In some embodiments, a bearing assembly for a farm implement includes a first race, a second race spaced apart from the first race to define a gap therebetween, a bearing rotatably disposed within the gap to allow relative movement between the first race and the second race, a seal including a flexible protrusion having a distal end that presses against the first race to seal off the gap, and a stop positioned adjacent to the flexible protrusion configured to prevent the distal end of the protrusion from bending towards the bearing.

DETAILED DESCRIPTION

While the present invention may be embodied in many different forms, a number of illustrative embodiments are described herein with the understanding that the present disclosure is to be considered as providing examples and not intended to limit the invention to the preferred embodiments described and/or illustrated herein.

Figure 1:
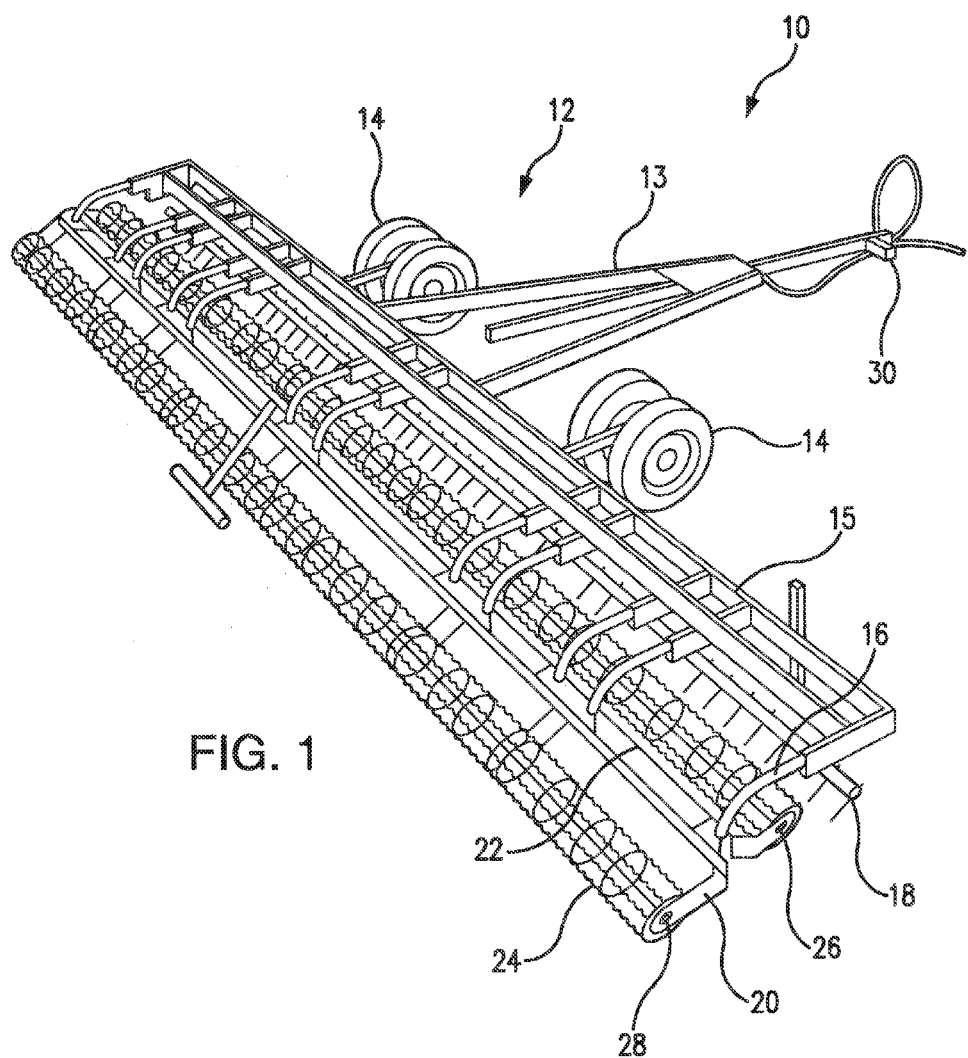
FIG. 1 illustrates a perspective view of a tilling implement in accordance with one embodiment of the present invention.

FIG. 1 illustrates a perspective view of a tilling implement 10. In some embodiments, tilling implement 10 can be self-propelled, drawn by a person or draft animal, or towed by a farm vehicle, such as a tractor or another suitable machine. Tilling implement 10 includes a frame 12 connected to wheels 14. Frame 12 includes a longitudinal portion 13 and a transverse portion 15 arranged in a generally T-shaped configuration. Frame 12 can further include a coupler 30 for removably attaching tilling implement 10 to a farm vehicle. A frame arm 16 extends from the transverse portion of frame 12 and is connected to a leveling bar 18 and a basket arm 20. Basket arm 20 extends from frame arm 16 and is connected to a first basket 22 and a second basket 24 via bearing assemblies 26 and 28 that allow baskets 22 and 24 to rotate with respect to basket arm 20. Generally speaking, bearing assemblies configured for use with tilling implement 10 can allow one or more tilling elements, such as rolling baskets, rolling harrows, crumbler rollers, and/or other similar devices to rotate relative to frame 12. The rotation of tilling elements can result from the tilling elements being pulled along the ground and/or can be power assisted for example through a power take-off. Such bearing assemblies can additionally or alternatively be used with other rotating parts of tilling implement 10 or other suitable devices.

Figure 2:
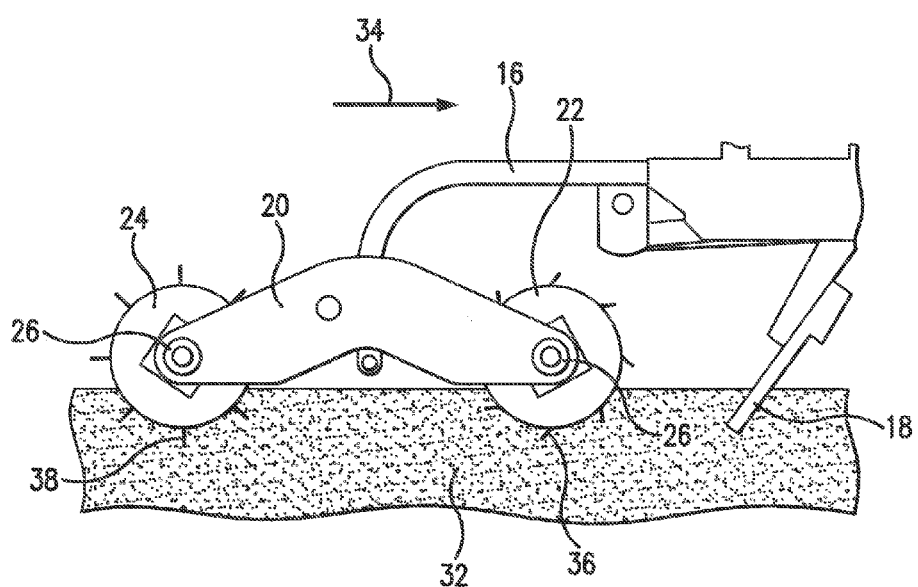
FIG. 2 illustrates a side view of a portion of the tilling implement of FIG. 1.

FIG. 2 illustrates a side view of a portion of tilling implement 10. As tilling implement 10 is moved across soil 32 in direction 34, leveling bar 18 can knock down ridges in soil 32, which can leave an even surface that facilitates planting or further soil conditioning. First basket 22 can, for example, be in the form of an "aggressive" style rolling basket and can include one or more spiraled, pitched blades 36 that penetrate and/or shatter soil 32 for soil conditioning, residue, chemical mixing, or for another purpose. Second basket 24 can be in the form of a "passive" style rolling basket and can, for example, include spiraled, straight blades 38 that smooth and level the surface of soil 32 which can result in more uniform germination and emergence, or another desired result. In some embodiments, tilling implement 10 can include alternative or additional tilling or soil conditioning tools. In some embodiments, tilling implement 10 can include only a single basket, or some other combination of the above devices.

Figure 3:
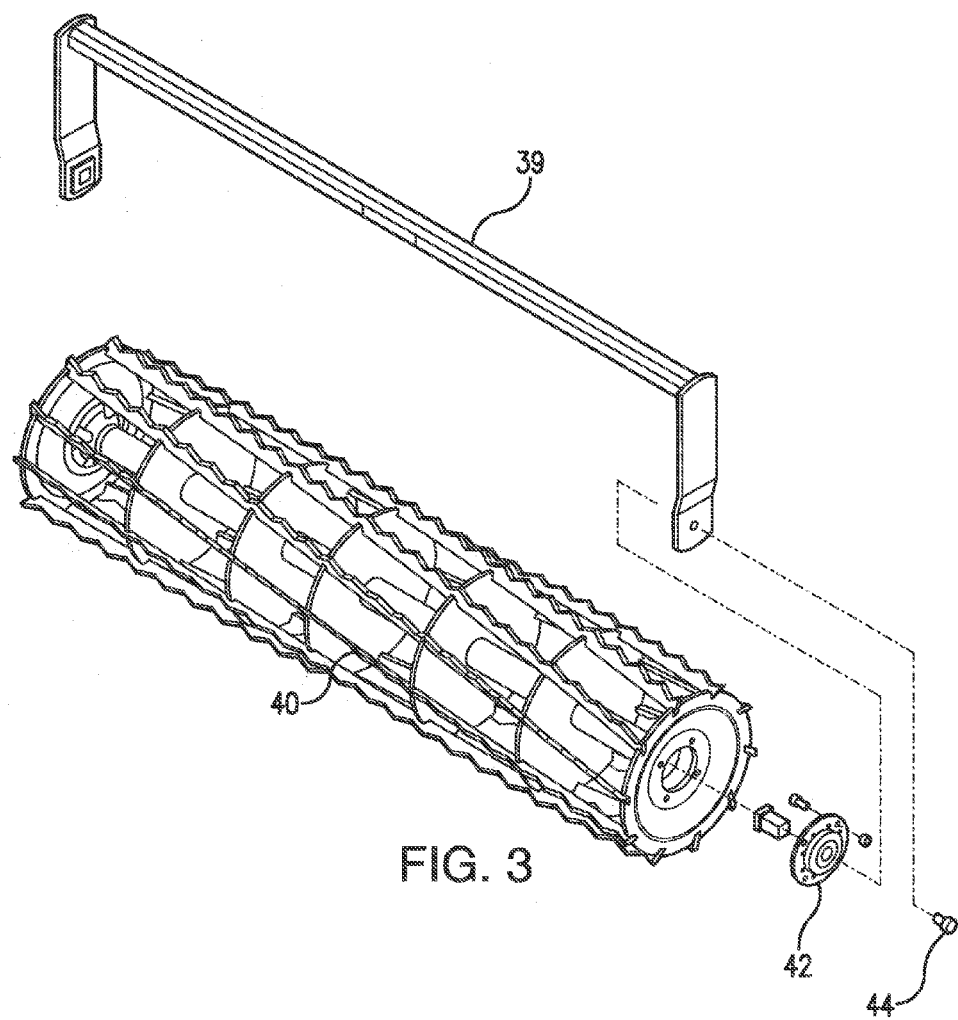
FIG. 3 illustrates an exploded view of a portion of a tilling implement in accordance with another embodiment of the present invention.

FIG. 3 illustrates an exploded view of a portion of another embodiment of a tilling implement. In this embodiment, basket arm 39 is rotatably attached to a single basket 40 via bearing assembly 42. Bearing assembly 42 can be attached to basket arm 20 and basket 40 via one or more bolts 44 and/or other suitable fasteners.

Figure 4:
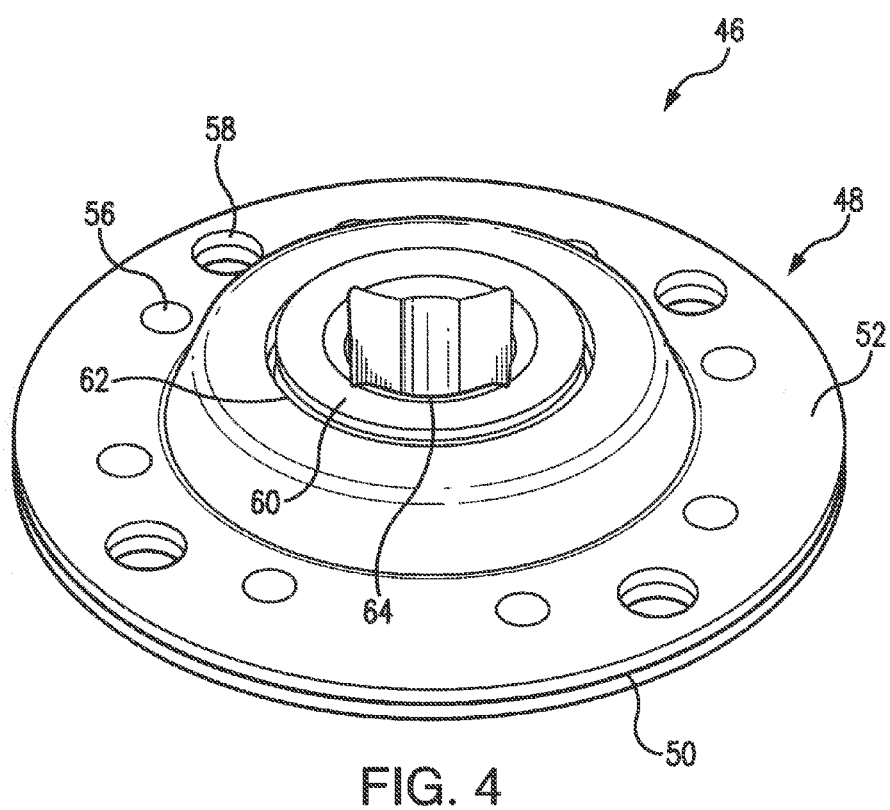
FIG. 4 illustrates a perspective view of a bearing assembly in accordance with one embodiment of the present invention.
Figure 5:
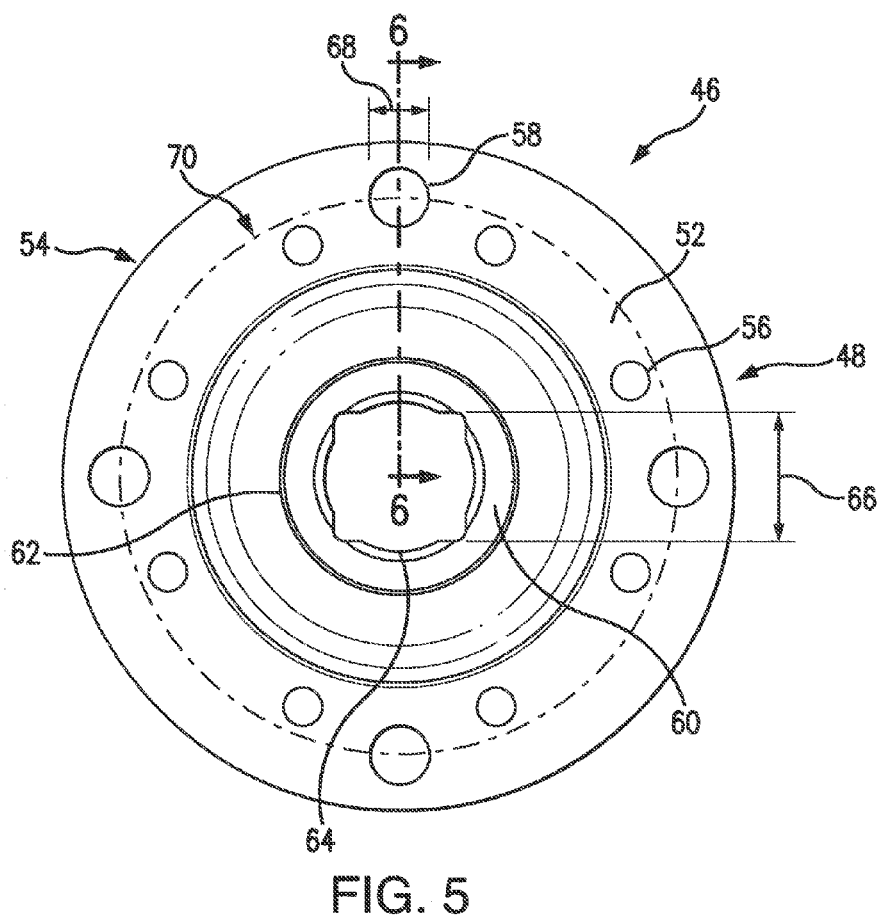
FIG. 5 illustrates a top plan view of the bearing assembly of FIG. 4.

FIGS. 4 and 5 illustrate various views of bearing assembly 46. In particular, FIG. 4 illustrates a top perspective view of bearing assembly 46 and FIG. 5 illustrates a top plan view of bearing assembly 46. One or more bearings (shown, for example in FIG. 6 at 76) can be rotatably housed within an assembly housing 48 of bearing assembly 46. As shown in FIG. 4, assembly housing 48 can be formed from two pieces of material with a seam 50 defined therebetween. In some embodiments, assembly housing 48 can be formed from a single piece of material or can be formed from more than two pieces of material. Assembly housing 48 can include a flange 52 extending therefrom. Flange 52 can include one or more rivets 56 for securing assembly housing 48 together. Flange 52 can further include one or more bolt holes 58 for attaching bearing assembly 46 to a rotating portion of tilling implement 10 such as basket 22. Bolt holes 58 can be circular as shown for example in FIG. 4, or square as shown for example in FIG. 5.

A rotatable inner race 60 is positioned relative to assembly housing 48 such that a bearing assembly gap 62 is defined therebetween to allow relative rotation between inner race 60 and assembly housing 48. A bore 64 can be formed in inner race 60 for receiving a shaft or another part of tilling implement 10.

Various suitable dimensions for bearing assembly 46 are shown in FIG. 5. For example, diameter 54 of bearing assembly 46 can be about 6". Width 66 of bore 64 can, for example, be about 1³⁄₁₆". Width 68 of bolt holes 58 can, for example, be about ¹⁷⁄₃₂". Bolt holes 58 can be formed in a circle around a center axis of bearing assembly 46, with the circle having a diameter 70 of about 5".

Figure 6:
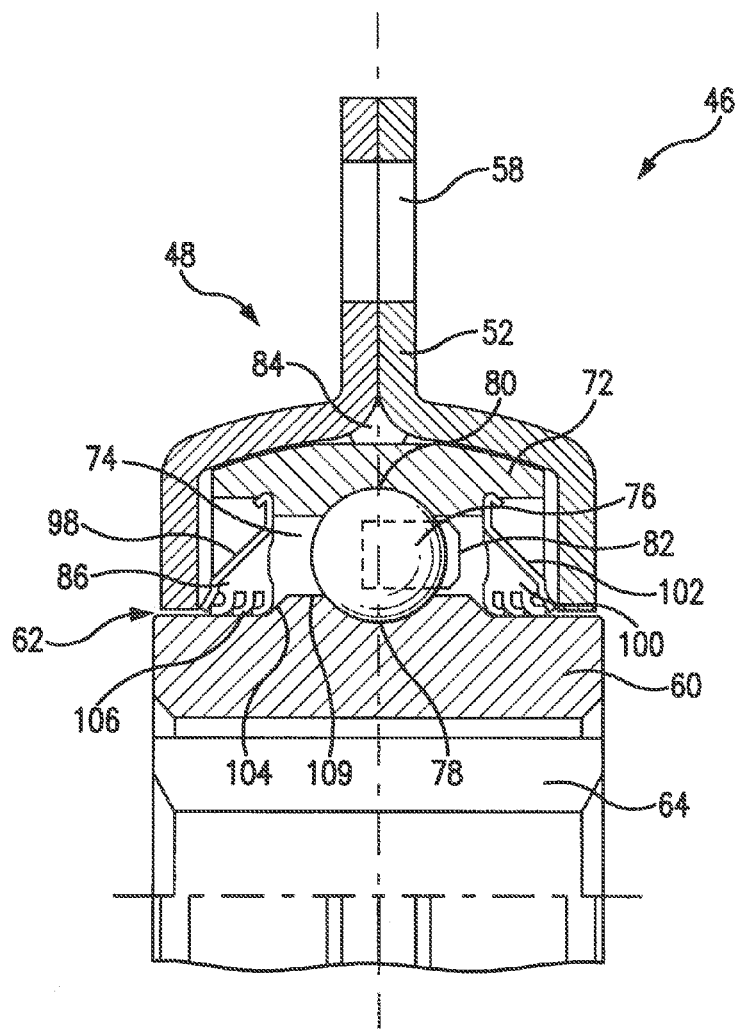
FIG. 6 illustrates a sectional view of the bearing assembly of FIG. 4 along line 6-6 of FIG. 5.
Figure 7:
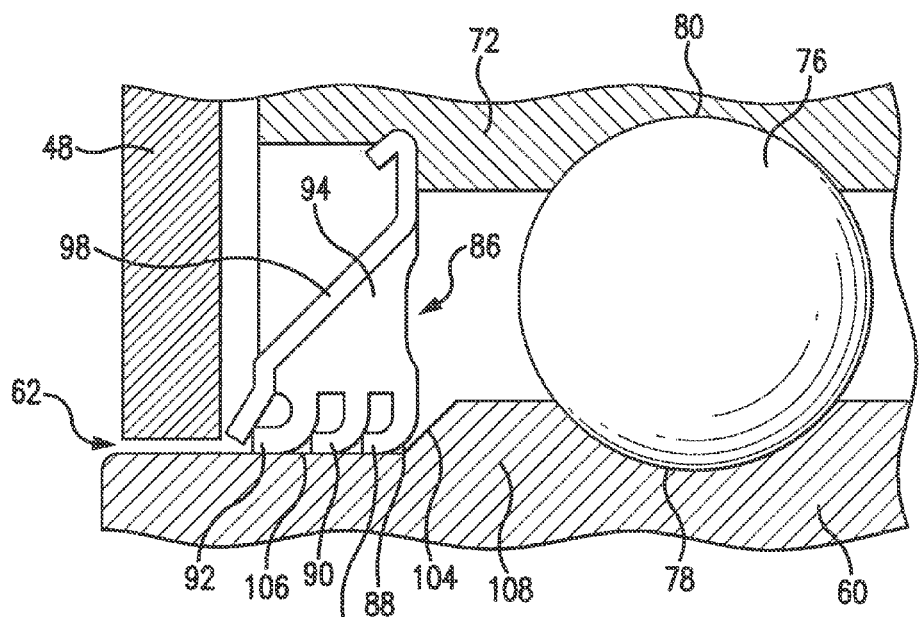
FIG. 7 illustrates an enlarged sectional view of a portion of a sealing arrangement of the bearing assembly of FIG. 4.
Figure 8:
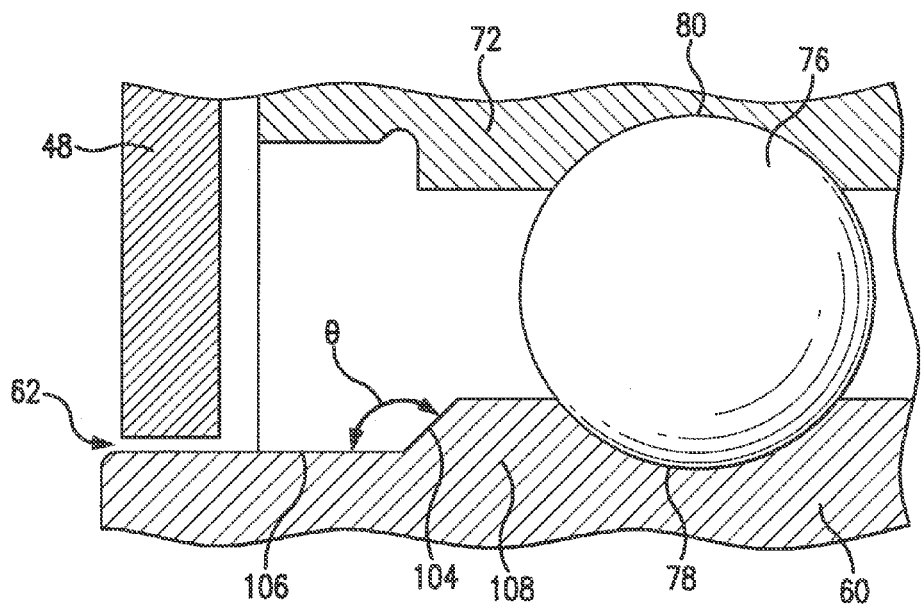
FIG. 8 illustrates the sectional view of FIG. 7 with the seal and seal ring of the bearing assembly removed.

FIGS. 6-8 illustrate sectional views of bearing assembly 46. In particular, FIG. 6 illustrates a sectional view of bearing assembly 46 along line 6-6 of FIG. 5, FIG. 7 illustrates an enlarged view of a portion of a sealing arrangement of FIG. 6, and FIG. 8 illustrates the view of FIG. 7 with portions of the sealing arrangement removed. Bearing assembly 46 includes inner race 60 and an outer race 72. Inner race 60 and outer race 72 can be radially spaced apart to define a bearing gap 74. In some embodiments, such as certain linear bearing assemblies, inner race 60 and outer race 72 can, for example, be linearly spaced apart to define a bearing gap. Bearing gap 74 can be filled at least partially with suitable bearing grease. For example, bearing gap 74 can be filled from about 60% to about 80% with bearing grease.

Bearing assembly 46 further includes one or more bearings 76 rotatably disposed within bearing gap 74 to allow relative movement between inner race 60 and outer race 72. Bearing 76 can be in the form of a ball bearing, roller bearing, or another suitable type of bearing.

Both inner race 60 and outer race 72 include respective annular grooves 78 and 80 in opposed relation to one another for receiving portions of bearing 76. Grooves 78 and 80 can be in the form of a semi-circular annular recess or another suitable groove shape. Bearing 76 can be further secured within bearing assembly 46 via a bearing retainer 82. Bearing retainer 82 can be made entirely or partially of plastic, metal, or another suitable material. Outer race 72 can be fixed to assembly housing 48 against one or more O-rings 84.

Bearing assembly 46 further includes a seal 86 held in compression between inner race 60 and outer race 72 for sealing bearing assembly gap 62. Seal 86 can be made entirely or partially of an elastomeric material such as rubber or another suitable seal material. As identified in FIG. 7, seal 86 can include one or more flexible lips 88, 90, and 92 that protrude from a base 94 of seal 86. Each lip 88, 90, and 92 can have a distal end, such as distal end 96 of lip 88, that presses against inner race 60 to seal bearing assembly gap 62, thereby sealing off a portion of bearing assembly 46. In the embodiment shown in FIG. 6, for example, inner race 60 includes a cylindrical surface 106 facing the seal 86 and lips 88, 90, and 92 are configured to press against the surface 106 to seal off a portion of bearing assembly 46 by bending against the surface 106 in a direction away from bearing 76. Bearing assembly 46 can include a seal ring 98 to affix seal 86 to outer race 72. Seal ring 98 can, for example, be press fitted to outer race 72 or another portion of bearing assembly 46. Seal ring 98 can be made entirely or partially of metal, plastic, or another suitable seal ring material. Bearing assembly 46 can include a second seal 100 and a second seal ring 102 that seals off another portion of bearing assembly 46.

Bearing assembly 46 further includes a stop 104 positioned adjacent to lip 88 and configured to prevent distal end 96 of lip 88 from bending towards bearing 76. In the embodiment of FIG. 6, inner race 60, outer race 72, seal 86, and stop 104 are concentric annular members. In some embodiments, stop 104 can be positioned to extend underneath a portion of lip 88 to force lip 88 to be bent away from bearing 76 at a desired angle or curve. Stop 104 includes an abutment face for contacting lip 88. In some embodiments, such as in the embodiment of FIG. 6, the abutment face is a frustoconical surface with an outer diameter that increases at an angle θ (shown in FIG. 8) of about 135 degrees relative to cylindrical surface 106. In some embodiments, the abutment surface may be oriented perpendicular to surface 106 or at an angle θ between about 90 degrees and about 135 degrees relative to surface 106. The surface of stop 104 and/or surface 106 of inner race 60 can be another suitable shape, orientation, or angle. In some embodiments, the abutment surface of stop 104 is curved or angled, for example, to define a desired bend of lip 88. Distal end 96 of protrusion 88 can seal off a portion of bearing 76 by bending against inner race 60 in a first direction away from bearing 76. In such a configuration, stop 104 can be positioned adjacent a side of seal 86 opposite the first direction. For example, in configurations wherein lip 88 is curved to form a concave shape against inner race 60 and away from bearing 76, stop 104 can be positioned on the convex side of lip 88 between bearing 76 and lip 88. The length, thickness, and other parameters of lip 88 can be configured such that lip 88 does not bend upward over stop 104 even in response to excessive force against lip 88.

In some embodiments, lips 88, 90, and 92 can be positioned with respect to stop 104 and each other such that the distal end of lip 90 abuts against lip 88 to prevent the distal end of lip 90 from bending towards bearing 76 when the distal end of lip 88 is bent away from bearing 76. Likewise, lips 88, 90, and 92 can be positioned with respect to stop 104 and each other such that the distal end of lip 92 abuts against lip 90 to prevent the distal end of lip 92 from bending towards bearing 76 when the distal end of lip 90 is bent away from bearing 76.

As shown in FIG. 6, stop 104 can be defined by a ridge 108 protruding radially outward from inner race 60 into gap 74. In some embodiments, ridge 108 includes a cylindrical outer surface 109 and a groove 78 formed in the outer surface 109 to receive bearings 76. In some embodiments, such as in the embodiment of FIG. 6, ridge 108 has an angled, for example frustoconical, shoulder defining stop 104. In some embodiments, ridge 108 defines two stops 104 at opposite sides of inner race 60.

Figure 9:
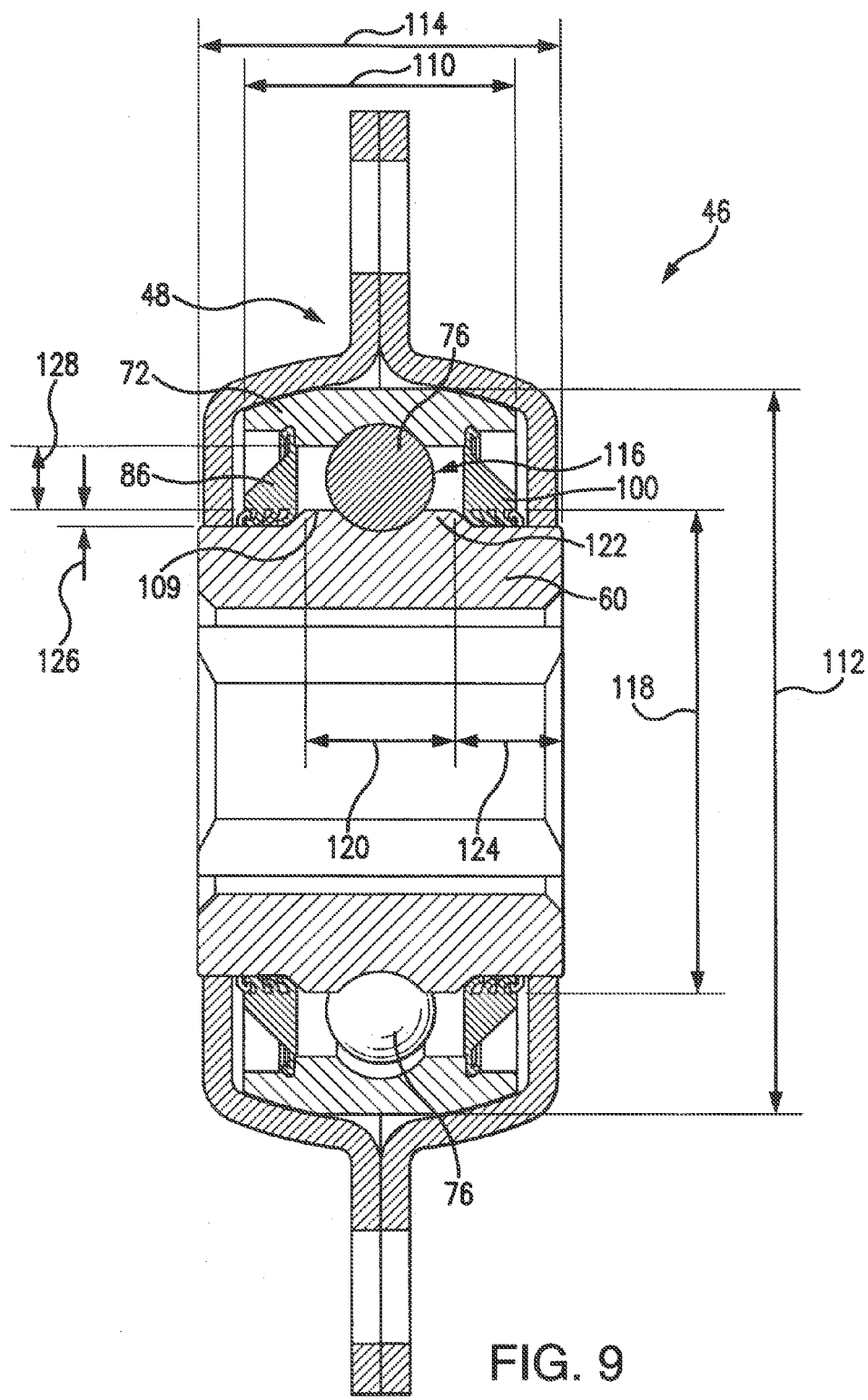
FIG. 9 illustrates a cross-sectional view of the bearing assembly of FIG. 4.

FIG. 9 illustrates a cross-sectional view of bearing assembly 46 showing various dimensions of bearing assembly 46. Width 110 of outer race 72 can be about 1.257". Outer diameter 112 of outer race 72 can be about 3.398". Width 114 of inner race 60 can be about 1.691". Diameter 116 of bearing 76 can be about 0.500". Diameter 118 of radial surface 106 of ridge 108 can be about 2.260". Distance 120 from an edge of radial surface 106 of ridge 108 to an edge of a second ridge 122 in bearing assembly 46 can be about 0.686". Distance 124 from an edge of radial surface of ridge 108 to a lateral edge of inner race 60 can be about 0.503". A length 126 of ridge 108 can be about 0.078". A length 128 from where lip 88 extends from seal 86 to an edge of outer race 72 can be about 0.299". Decimal tolerances for dimensions identified herein can, for example, be +/−0.010". Fractional tolerances for dimensions identified herein can, for example, be +/−1/16".

In operation, as tilling implement 10 moves across soil 32, one or more tilling elements, such as first basket 22 and second basket 24 are dragged along and rotated against soil 32. Contaminants, such as dirt, loose weeds, roots, and other residue pass through bearing assembly gap 62 but are prevented from entering bearing gap 74 because of seal 86. In particular, first lip 88, second lip 90, and third lip 92 press against inner race 60 to seal off bearing 76 from the contaminants. As more contaminants pass through bearing assembly gap 62, they will apply pressure to lips 88, 90, and 92 to bend inward towards bearing 76. However, due to stop 104, at least lip 88 will be prevented from bending towards bearing 76. In some embodiments, lips 88, 90, and 92 are positioned relative to stop 104 and each other to prevent any of lips 88, 90, and 92 from bending towards bearing 76.

All numbers in this description indicating amounts, ratios of materials, physical properties of materials, and/or use are to be understood as modified by the word "about," except as otherwise explicitly indicated. The choice of materials for the parts described herein can be informed by the requirements of mechanical properties, temperature sensitivity, moldability properties, or any other factor apparent to a person having ordinary skill in the art. For example, one more of the parts described herein (or a portion of one of the parts) can be made from suitable metals, alloys, plastics, and/or other suitable materials.

While the embodiments presented herein have been set forth and described in detail for the purposes of making a full and complete disclosure of the subject matter thereof, such disclosure is not intended to be limiting in any way with respect to the true scope of this invention as the same is set forth in the appended claims.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

We claim:

1. A tilling implement for use with a farm vehicle, the tilling apparatus including:
a frame;
a tilling element attached to the frame; and
a bearing assembly configured to allow the tilling element to rotate relative to the frame, the bearing assembly including:
a first race;
a second race spaced apart from the first race to define a gap therebetween;
a bearing rotatably disposed within the gap to allow relative movement between the first race and the second race;
a seal spaced from the bearing and having a main body proximate the second race and a flexible lip protruding distally from the seal main body in a first direction away from the second race and toward the first race, wherein the lip bends away from the bearing to define a convex side facing the bearing and wherein a distal end of the lip presses against a portion of the first race to seal off a first portion of the bearing assembly containing the bearing; and
a stop positioned on the first race adjacent to the lip to prevent the distal end of the lip from bending towards the bearing, wherein the stop is positioned to engage the convex side of the lip.

2. The tilling apparatus of claim 1, wherein the tilling element is a disc harrow.

3. The tilling apparatus of claim 1, further comprising:
a coupler configured to removably connect the frame to the farm vehicle.

4. The tiling apparatus of claim 1, wherein the tilling apparatus is configured to be towed behind the farm vehicle.

5. The tilling apparatus of claim 1, wherein the stop is defined by a ridge protruding from the first race in a second direction opposite the first direction.

6. The tilling apparatus of claim 5, wherein the ridge includes a frustoconical surface facing the distal end of the lip.

7. The tilling apparatus of claim 6, wherein the first race includes a cylindrical surface for contacting the distal end of the lip, and wherein the frustoconical surface of the stop is oriented at an angle ranging from about 90 degrees to about 135 degrees relative to the cylindrical surface of the first race.

8. The tilling apparatus of claim 1, wherein the bearing assembly further includes a seal ring, and wherein the seal is positioned between the seal ring and the stop.

* * * * *